United States Patent
Hueter et al.

(10) Patent No.: US 8,903,811 B2
(45) Date of Patent: *Dec. 2, 2014

(54) SYSTEM AND METHOD FOR PERSONALIZED SEARCH

(75) Inventors: Geoffrey J. Hueter, San Diego, CA (US); Steven C. Quandt, Encinitas, CA (US)

(73) Assignee: Certona Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/416,434

(22) Filed: Apr. 1, 2009

(65) Prior Publication Data

US 2009/0248682 A1 Oct. 1, 2009

Related U.S. Application Data

(60) Provisional application No. 61/041,447, filed on Apr. 1, 2008.

(51) Int. Cl.

| G06F 9/44 | (2006.01) |
|---|---|
| G06Q 10/00 | (2012.01) |
| H04L 12/58 | (2006.01) |
| G06N 99/00 | (2010.01) |
| G06Q 30/00 | (2012.01) |
| G06Q 30/02 | (2012.01) |
| G06Q 30/06 | (2012.01) |

(52) U.S. Cl.
CPC .............. *G06Q 10/00* (2013.01); *H04L 12/585* (2013.01); *G06N 99/005* (2013.01); *G06Q 30/00* (2013.01); *G06Q 30/0185* (2013.01); *G06Q 30/0201* (2013.01); *G06Q 30/0202* (2013.01); *G06Q 30/0255* (2013.01); *G06Q 30/0269* (2013.01); *G06Q 30/0631* (2013.01)
USPC .......................................... 707/723; 707/734

(58) Field of Classification Search
CPC .................................................. G06Q 30/0631
See application file for complete search history.

(56) References Cited

U.S. PATENT DOCUMENTS

| 6,314,421 | B1 * | 11/2001 | Sharnoff et al. ...................... 1/1 |
|---|---|---|---|
| 6,460,036 | B1 * | 10/2002 | Herz ............................... 707/748 |
| 6,665,667 | B2 * | 12/2003 | Inaba et al. ........................... 1/1 |
| 6,847,966 | B1 * | 1/2005 | Sommer et al. ............... 707/739 |
| 6,910,037 | B2 * | 6/2005 | Gutta et al. .................... 707/730 |
| 6,952,691 | B2 * | 10/2005 | Drissi et al. ............................ 1/1 |
| 7,301,341 | B2 * | 11/2007 | Hargreaves et al. .......... 324/307 |
| 7,406,479 | B2 * | 7/2008 | Shriraghav et al. .................... 1/1 |
| 2004/0039657 | A1 * | 2/2004 | Behrens et al. ................. 705/26 |
| 2004/0076936 | A1 * | 4/2004 | Horvitz et al. ................ 434/236 |
| 2005/0256848 | A1 * | 11/2005 | Alpert et al. ...................... 707/3 |
| 2007/0106659 | A1 * | 5/2007 | Lu et al. ............................ 707/5 |
| 2007/0112792 | A1 * | 5/2007 | Majumder ..................... 707/100 |
| 2008/0059512 | A1 * | 3/2008 | Roitblat et al. ............... 707/102 |
| 2008/0114751 | A1 * | 5/2008 | Cramer et al. .................... 707/5 |

(Continued)

*Primary Examiner* — Don Wong
*Assistant Examiner* — Theodore Hebert
(74) *Attorney, Agent, or Firm* — Richard D. Clarke

(57) ABSTRACT

A system and method is disclosed for profiling a subject's search engine keywords and results based on relevancy feedback. Because the system is based on the search behavior of the user, the profiling is language independent and balances the specificity of search terms against the profiled interests of the user. The system can also synthesize new keyword combinations to assist the user in refining the search or acquiring related content. The system has application in text mining, personalization, behavioral search, search engine optimization, and content acquisition, to name but a few applications.

10 Claims, 6 Drawing Sheets

(56) References Cited

U.S. PATENT DOCUMENTS

| | | |
|---|---|---|
| 2008/0168056 A1* | 7/2008 | Bluvband et al. ............... 707/5 |
| 2008/0189232 A1* | 8/2008 | Dunning et al. ............... 706/45 |
| 2008/0215453 A1* | 9/2008 | Yoshii ............................ 705/26 |
| 2008/0244428 A1* | 10/2008 | Fain ............................... 715/764 |
| 2008/0319995 A1* | 12/2008 | Alspector et al. ................ 707/6 |
| 2009/0248682 A1* | 10/2009 | Hueter et al. ..................... 707/5 |
| 2009/0313706 A1* | 12/2009 | Zhang et al. .................... 726/30 |
| 2010/0166309 A1* | 7/2010 | Hull et al. ..................... 382/176 |

* cited by examiner

SYSTEM AND METHOD FOR PERSONALIZED SEARCH

FIELD OF THE INVENTION

The present invention relates to electronically targeting goods, services, content, and other entities through the automated analysis of human behavior. Particularly, the invention relates to the representation of subject and object characteristics for purposes of efficient generation of recommendations. The system has application in text mining, personalization, behavioral search, search engine optimization, and content acquisition, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over other collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
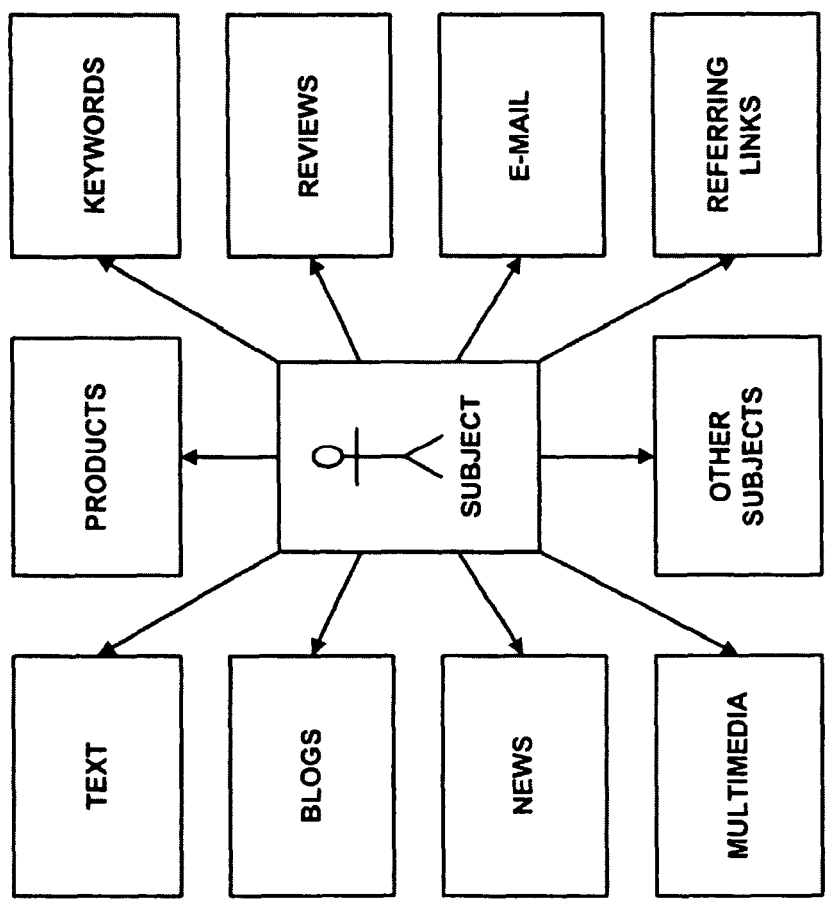
FIG. 1 shows examples of relationships between the subject and various types of individualized content and other subjects.

The following detailed description is related to the technology disclosed in U.S. patent application Ser. No. 12/415,758 filed on Mar. 31, 2009 and U.S. patent application Ser. No. 12/416,005 filed on Mar. 31, 2009, and both are incorporated by reference herein, in their entirety. FIG. 1 shows examples of relationships between the subject and various types of individualized content and other subjects. As shown, the system simultaneously profiles any content that can be individually and repeatably identified by the system, using the systems and methods described previously in U.S. patent application Ser. No. 12/415,758 and U.S. patent application Ser. No. 12/416,005. Associations are created between subjects and different object types as subjects interact with multiple types of objects within a session. Once these associations are created, the profiler develops universal profiles across object types, so that any object can be matched against any subject or any other object, regardless of type.

Figure 2:
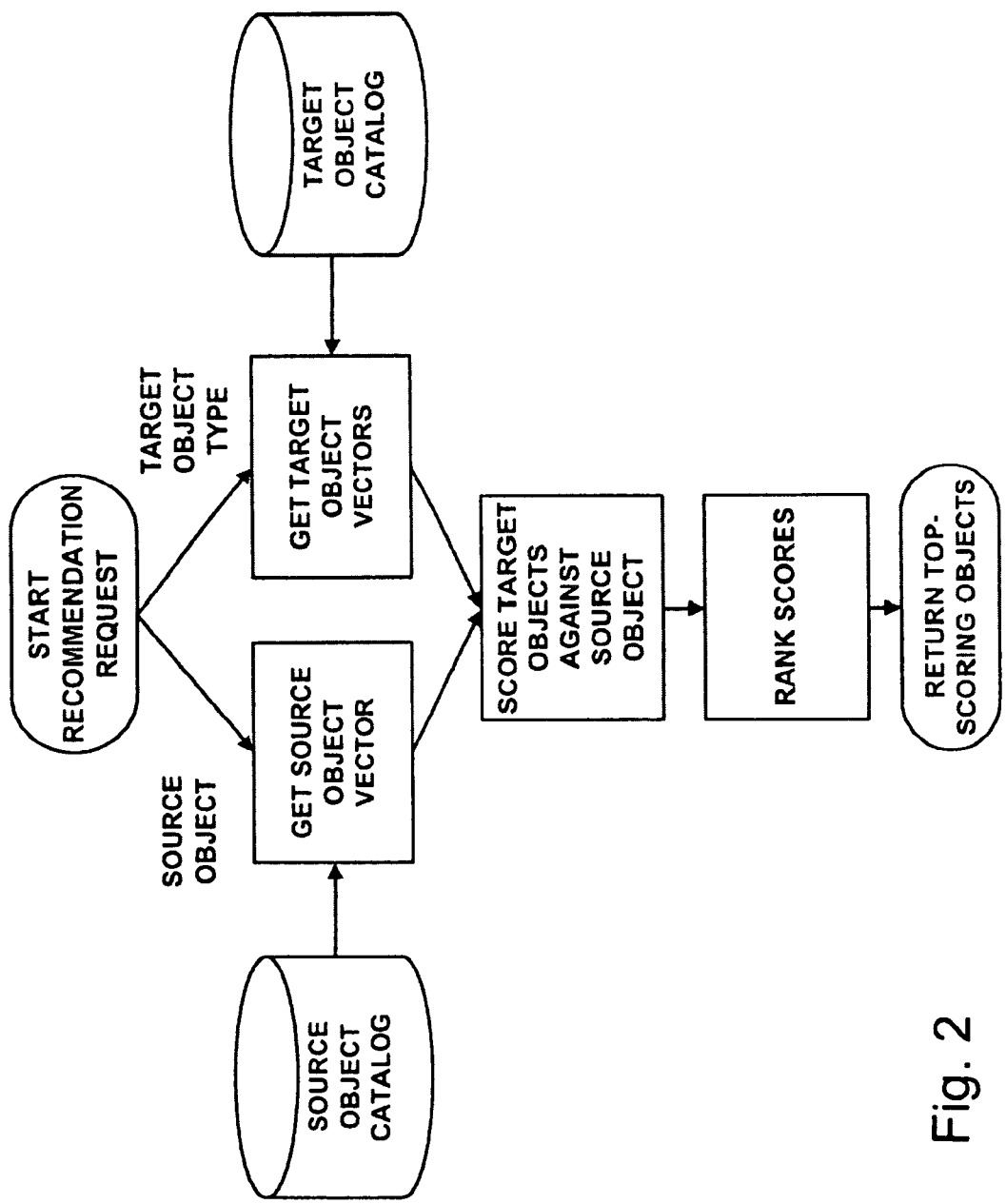
FIG. 2 shows the operation of the system to match and rank one type of object against a set of objects of another type.

FIG. 2 shows the operation of the system to match and rank one type of object against a set of objects of another type. This is similar to the method described previously in U.S. patent application Ser. No. 12/415,758 filed on Mar. 31, 2009 and U.S. patent application Ser. No. 12/416,005 filed on Mar. 31, 2009, except that the target objects are restricted to those that are of the type of object being requested, for example text, products, keywords, blogs, reviews, news, e-mail, multimedia, or referring/source links. For the embodiment of the system as a search engine, the source entity is a keyword, or search term. Note that the matching and targeting can also be done using a subject as the source entity, and that the source entity, either subject or object, can be matched against any subjects as well. The recommendation request is handled as follows: First, the source object vector is retrieved from the source object catalog. Next, the set of target object vectors are retrieved from the target object catalog and matched/scored against the source object vector. The scored objects are ranked and the top-ranking objects are returned to the application for presentation to the user.

Figure 3:
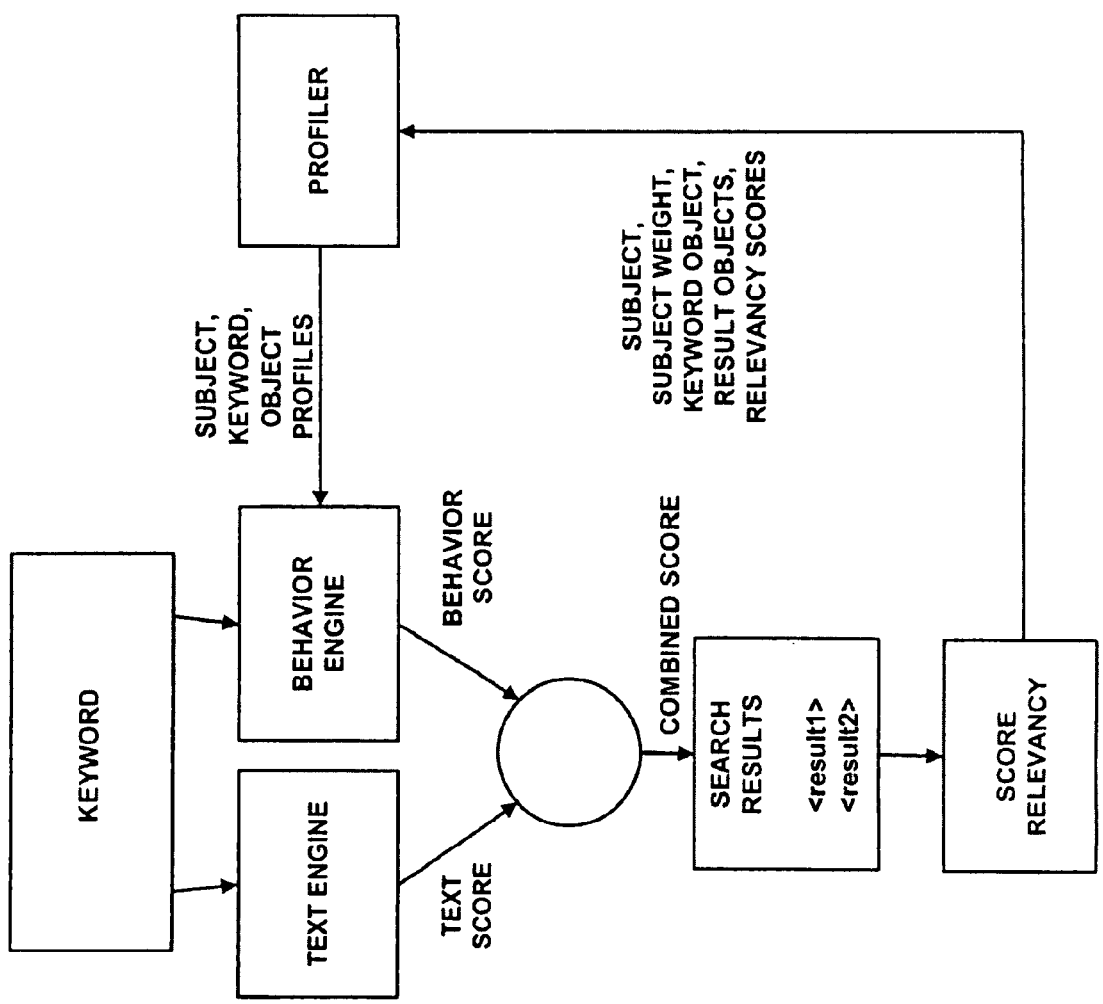
FIG. 3 shows the operation of the system as a search engine.

FIG. 3 shows the operation of the system as a search engine. In this application the keywords are processed by both a conventional text-based search engine, such as Google, and a behavioral search engine that utilizes the behavioral profiling and targeting system described in this invention. The text-based search engine generates a relevancy score for each target object. The behavioral search engine matches the keyword profiles and the target object profiles to produce a behavioral score for each target object. If the keyword has not been profiled, then the individual user profile is matched against the object profiles to produce the behavioral scores for the target objects. Note that in the latter case, the behavior combines both general relevancy against the keyword as well as the specific interests of the user. Alternatively, this can be made more explicit by creating the behavior score as a combination of the scores that result from matching keyword objects with the target objects and the scores that result from matching the subject with the target objects. Regardless of how the behavior score is derived, the relevancy scores and the behavioral scores are combined according to the convex combination:

COMBINED SCORE=$a$*(TEXT SCORE)+(1−$a$)* (BEHAVIOR SCORE), where a is a continuous value between 0 and 1, inclusive, that determines the weighting or balance between the two search engines. The search results are then ranked by the combined score, and the highest-ranking results are presented back to the user. Note that this method of combining scores naturally balances which engine drives the search results back to the user. For example, a very specific search might produce a sharp falloff in relevancy scores, in which case the behavioral scores would only slightly modify the ranking of the top search results, whereas a more general search might produce a broad distribution of relevancy scores, so that the behavioral scores and the additional inferred interests of the user become the differentiators in ranking the search results. Once the search results are presented to the user, the user then provides feedback on the relevancy of each given result based on either direct explicit rating of the relevancy, such as by rating a given item as "Relevant" or "Not Relevant", or implicit rating through selection, non-selection, and subsequent action. The subject, keyword object, result objects, result objects' relevancy scores, and relevancy score weights are then submitted to the profiler, which updates the subject, keyword object, and result object profiles according to the manner described previously in U.S. patent application Ser. No. 12/415,758 filed on Mar. 31, 2009 and U.S. patent application Ser. No. 12/416,005 filed on Mar. 31, 2009. Note that because the profiling is based on the user's response to their keyword searches, the system does not need to parse or otherwise analyze the keywords or the target objects, so that in particular the system is language-independent, in fact provides a de facto translation of keywords as different language users perform searches for similar content. Also, the system does not require a pre-built taxonomy to provide targeted search results even in expert domains. Also note that in building the keyword profiles, if the search is performed in a domain where the expertise of the user is important in determining the relevancy of a search result, such as in the case of a technical, medical, or other highly targeted search domain, the relevancy scores from designated experts may be weighted more than those of casual or less-expert users. Also note that when presented with an unknown keyword phrase, the behavior engine can bootstrap itself by presenting random results and then learning from user response, but it is more efficient and desirable to have the system default to a text engine in these circumstances. Alternatively, the system can break the phrase into recognizable components, for example individual words that have already been profiled by the system, and then combine the results of the individual components together according to the method of Circle of Friends described previously in U.S. patent application Ser. No. 12/415,758 filed on Mar. 31, 2009.

Figure 4:
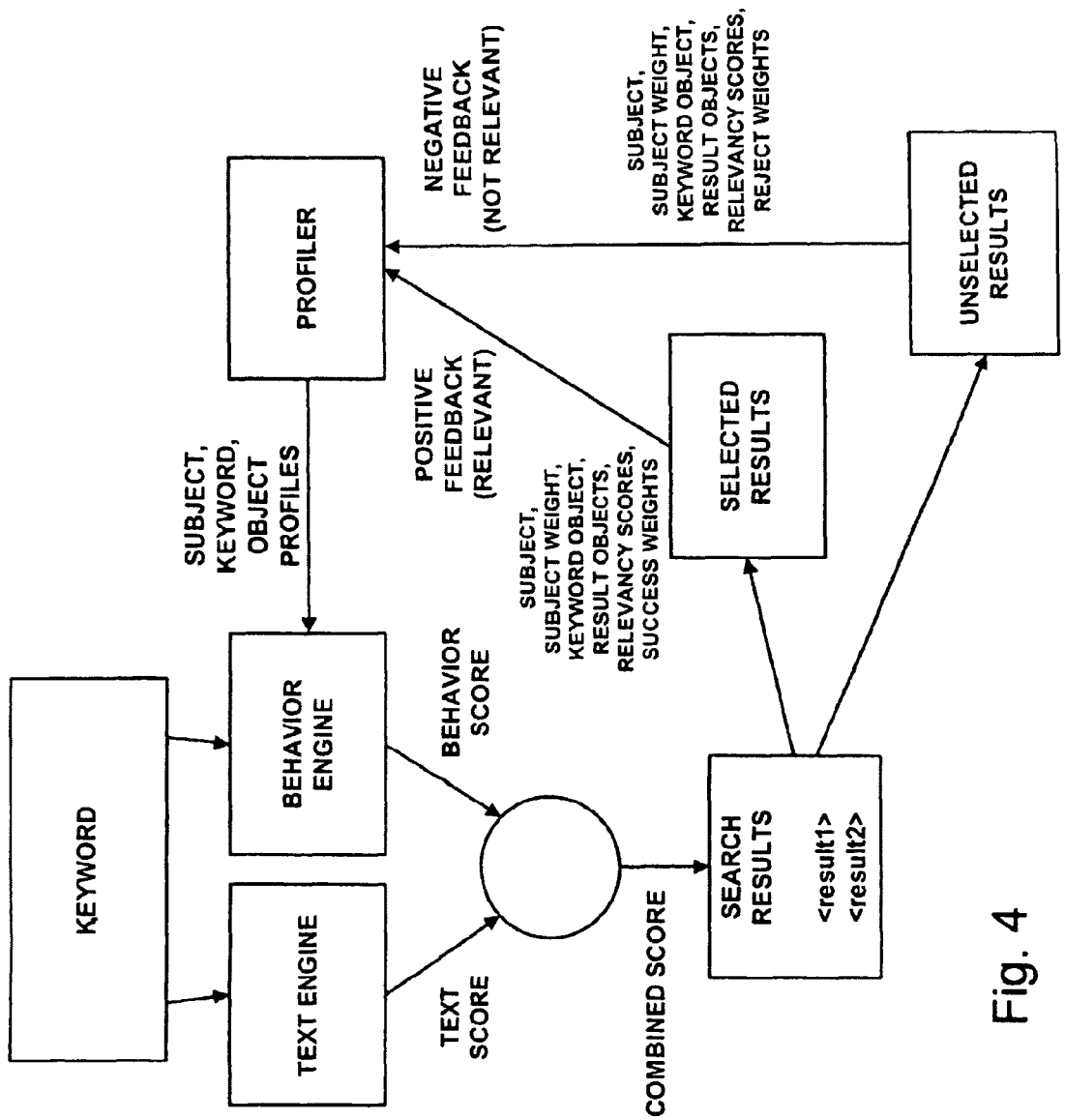
FIG. 4 shows the operation of the system as a search engine using implicit feedback based on subject response to search results.

FIG. 4 shows the operation of the system as a search engine using implicit feedback based on subject response to search results. This sample embodiment would apply when the Resonance behavioral engine is used in a non-expert, general search environment. In such cases, the relevancy scores and weighting are derived using a target model as described previously in U.S. patent application Ser. No. 12/416,005 filed on Mar. 31, 2009. In this model, results that are presented and not selected by the user for further investigation are considered low-relevance and low-weight. If a result is presented multiple times to the user and not selected, then that increases the weighting of that negative response. Results that are selected are considered higher relevance and higher weight. Of the selected results further relevance can be attributed based on re-selecting a search result or spending more time examining the contents of a search result.

Figure 5:
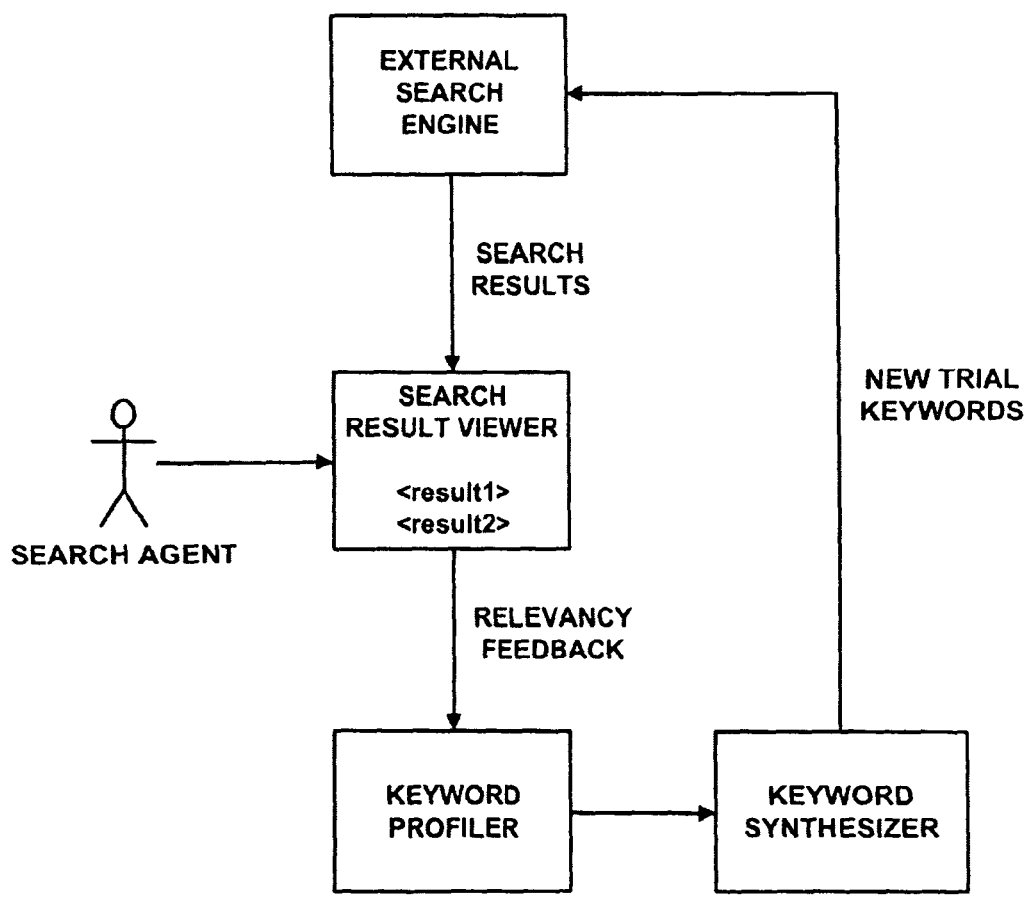
FIG. 5 shows the operation of the system as a content acquisition engine.

FIG. 5 shows the operation of the system as a content acquisition engine. There is a search agent who is requesting and evaluating results through interaction with a search result viewer. The search agent generates relevancy feedback through interaction with the results in the results viewer. These are used by the profiler to create profiles of the search agents, keywords, and result objects. These profiles are then matched by the keyword synthesizer against other profiled keywords to create new trial keyword phrases.

Figure 6:
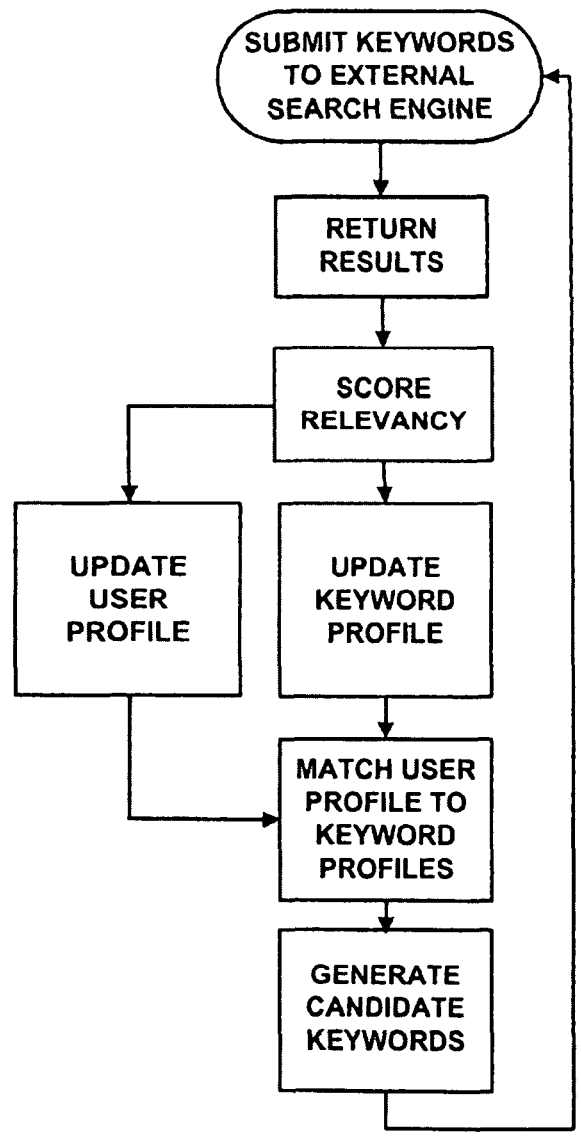
FIG. 6 shows the content acquisition workflow.

FIG. 6 shows the content acquisition workflow. First, an initiating keyword phrase is submitted by the search user to an external search engine, which then returns search results for review by the search user. The user then implicitly or explicitly scores the relevancy of the results. The system profiles the search user, keywords, and results based on the search interests and the associated responses of keywords and results within a search session. The profiles are then used to generate new keywords by matching the search user subject profile to the keyword profiles and then using the top-matching keyword phrase and/or individual keyword components to generate new trial keywords for subsequent search. This process is iterated and refined as the search user provides feedback on the subsequent search results. In addition, the object vector clustering techniques described previously in U.S. patent application Ser. No. 12/415,758 filed on Mar. 31, 2009 can be used to tag new content of interest as it comes into the system by setting a region of interest around a keyword profile vector. The user can adjust how much content is tagged by adjusting the size of the region of interest.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact require knowledge of the application search domain, does not need to parse the application's content to extract metadata to associate with keywords, and does not need taxonomic or semantic information about the application search domain, so that the system is language-independent and self-adapts to the interests of each user.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A computer-implemented method comprising:
    generating a score for a subject and search keyword objects of target object provided by an online computer-based search directed to an object type, either by explicit or by behaviorally inferred subject responses, wherein the generated object score is based on relevancy to the subject and search keywords of the target objects provided by the online computer-based search;
    representing each of said subject and said objects in individualized vector form at a computer server, wherein the predicted relevancy of a target object to a search keyword object is generated by matching the search keyword object vector to the target object vector, and the predicted affinity of the subject to the target object is generated by matching the subject vector to the target object vector, further wherein said matching is calculated as the dot product between said vectors;

generating search results by matching profiles of said subject and keywords with profiles in a target object catalog and ranking against said profile of said subject and keywords; and presenting said subject with top-ranking target objects, such that said top-ranking target objects are tailored to said subject;

wherein the presented target objects are restricted to the object type of the online computer-based search; and wherein the computer server is further configured to generate the subject vector and the object vector by producing initial subject vectors and initial object vectors having respective initial dimensions, to determine predicted search relevance scores based on the initial subject vectors, initial object vectors, and subject search response data, and to calculate a cost function as the mean squared error between the predicted relevance scores and actual relevance scores across all said subject responses; and wherein the computer server iteratively increases the dimensions of the generated subject and object vectors and generates the values of the added dimensions of both said subject and object vectors to reduce the cost function based on the differences between the predicted relevance scores and actual relevance scores, until the cost function decreases to a predetermined value, and wherein the actual relevance scores are based on user input.

2. The method according to claim 1, wherein said generating a score comprises causing said subject to score said relevancy of objects only by behavioral inference.

3. The method according, to claim 1, wherein said presenting said subject with top-ranking target objects includes presenting said top-ranking objects and content of different languages.

4. The method according to claim 1 wherein said presenting said subject with top-ranking target objects includes combining user behavioral search relevancy scores with textual search relevancy scores.

5. The method according to claim 1, wherein said step of representing said subject and said objects in vector form includes:

deriving said vector form solely from said subject's relevancy ratings of said objects weighting relevancy ratings of users designated as expert, higher than relevancy ratings of users designated as non-experts and increasing said weighting for repeated occurrences of either viewing or not viewing a search result, 6. The method according to claim 1, further comprising clustering search objects in vector form to identify content regions of interest, to said subject.

7. A method for personalized search, the method comprising the steps of:

submitting keywords to a search engine at a computer to generate keyword search results;

presenting said keyword search results from the computer to a user;

receiving user-specific search results at the computer;

rating relevancy of the user-specific search results according to user response;

developing or updating user, keyword, and content profiles, each of the respective profiles being in vector form;

updating the keyword profiles and content profiles, and displaying updated search results to the user, such that said user and each object or a group profile thereof are symmetric with each other and are each profiled through an individual vector such that the values and number of dimensions of said vectors are based solely on the user responses to the objects;

clustering and synthesizing an updated set of keywords;

generating target objects by matching a. profile of said user with profiles in a target object catalog and ranking against said profile of said user, presenting said user with top-ranking target objects, such that said top-ranking target objects are tailored to said user, wherein the presented target objects are restricted to the object type of the user-selected search result; and further wherein the user vector, keyword vector, and the content vector each have a respective number of dimensions: and further wherein the predicted relevancy rating of a content object to a search keyword is calculated by matching their object vectors: and further wherein object vectors are generated by producing object vectors having respective initial dimensions, determining predicted relevancy ratings based on the initial object vectors, and calculating a cost function as the mean squared difference between the predicted relevancy ratings and the user relevancy ratings across all said user relevancy ratings; and further wherein the dimensions of the generated object vectors are iteratively increased, and the values of the added dimensions are calculated to reduce said cost function, until said cost function reaches a predetermined value and wherein the user relevancy ratings are based on user response to search results; and further wherein the user vectors are generated from the said content object vectors and said user relevancy ratings derived from said user response.

8. The method according to claim 7, wherein said step of submitting keywords includes the step of:

searching for products or content on a website.

9. The method according to claim 1, wherein further comprising updating said profile of said subject separately by decoupling relevancy scores and weights for said subject from other subjects, such as to train said subject vector individually, thereby enabling individualized targeting of increasing numbers of said subjects.

10. The method according to claim 1 wherein the step of representing said subject in vector form comprises including one or more of search interests or behavioral responses to search results as vector generation input data.

* * * * *